United States Patent [19]

Grant et al.

[11] Patent Number: 4,963,620

[45] Date of Patent: Oct. 16, 1990

[54] POLYPHENYLENE ETHER-POLYAMIDE BLENDS

[75] Inventors: Thomas S. Grant, Vienna; Ronald L. Jalbert, Parkersburg, both of W. Va.

[73] Assignee: Borg-Warner Chemicals, Inc., Parkersburg, W. Va.

[21] Appl. No.: 308,090

[22] Filed: Feb. 9, 1989

Related U.S. Application Data

[62] Division of Ser. No. 89,333, Aug. 25, 1987, Pat. No. 4,826,933.

[51] Int. Cl.$^5$ .............................................. C08L 71/12
[52] U.S. Cl. ...................................... 525/68; 525/123; 525/132; 525/148; 525/151; 525/152; 525/905
[58] Field of Search ............... 525/152, 397, 905, 68, 525/132, 148, 123, 151

[56] References Cited

U.S. PATENT DOCUMENTS

| | | |
|---|---|---|
| 3,375,228 | 3/1968 | Holoch et al. . |
| 3,379,792 | 4/1968 | Finholt . |
| 4,048,143 | 9/1977 | Hay et al. . |
| 4,148,843 | 4/1979 | Goossens . |
| 4,165,422 | 8/1979 | White . |
| 4,315,086 | 2/1982 | Ueno et al. . |
| 4,338,421 | 7/1982 | Maruyama et al. . |
| 4,600,741 | 7/1986 | Aycock et al. . |
| 4,824,915 | 4/1989 | Aycock ............... 525/397 |

FOREIGN PATENT DOCUMENTS

| | | |
|---|---|---|
| 46040 | 2/1982 | European Pat. Off. . |
| 0129762 | 1/1985 | European Pat. Off. . |
| 129825 | 1/1985 | European Pat. Off. . |
| 131445 | 1/1985 | European Pat. Off. . |
| 59-66452 | 4/1984 | Japan . |
| WO85/05372 | 12/1985 | PCT Int'l Appl. . |
| WO87/01713 | 3/1987 | PCT Int'l Appl. . |

*Primary Examiner*—Jacob Ziegler
*Attorney, Agent, or Firm*—Lowe, Price, LeBlanc, Becker & Shur

[57] ABSTRACT

Thermoplastic blend compositions comprise a polyphenylene ether resin, a polyamide resin and a compatibilizing agent present in an amount sufficient to effect compatibilization of the polyphenylene ether resin and the polyamide resin. The compatibilizing agent comprises a compound selected from the group consisting of tetracarboxylic acids of aromatic and alicyclic compounds and dianhydride derivatives thereof, and halogen substituted phthalic anhydrides.

4 Claims, No Drawings

POLYPHENYLENE ETHER-POLYAMIDE BLENDS

This is a division, of application Ser. No. 089,333, now U.S. Pat. No. 4,826,933.

FIELD OF THE INVENTION

The present invention relates to thermoplastic blend compositions comprising a polyphenylene ether resin, a polyamide resin and a novel compatibilizing agent. The novel thermoplastic compositions comprise ductile, nondelaminating blends exhibiting improved compatibility and impact properties.

BACKGROUND OF THE INVENTION

Polyphenylene ether resins are known in the art and exhibit an desirable combination of chemical, physical and electrical properties over a temperature range of more than about 650° F., extending from a brittle point of about −275° F. to a heat distortion temperature of about 375° F. This combination of properties renders polyphenylene ether resins suitable for a broad range of applications. However, the usefulness of polyphenylene ether resins is limited in some applications as a consequence of processibility, impact resistance and chemical resistance. It is known to modify or cap polyphenylene ether resins with various compounds in order to improve the processibility and impact and chemical resistances of the resins. For example, the Holoch et al U.S. Pat. No. 3,375,228 discloses modifying polyphenylene ether resins with capping agents such as acid halides, anhydrides and ketenes in order to improve the processibility of the resin and prevent discoloration and embrittlement of the resin. Similarly, the Hay et al U.S. Pat. No. 4,048,143 discloses the reaction of capping agents such as monoacyl halides, monosulfonyl halides, monocarboxylic acid anhydrides, alkyl halides and dialkyl sulfates with polyphenylene oxide resins in order to reduce the oxidative and thermal degradation of the resins. Additionally, the White U.S. Pat. No. 4,165,422 discloses acyl capped quinone-coupled polyphenylene oxides and the Goossens U.S. Pat. No. 4,148,843 discloses acid halide, acid anhydride and ketene capped polyphenylene oxide resins having improved properties.

Alternatively, polyphenylene ether resins have been blended with other resins in order to improve their undesirable properties. For example, the Finholt U.S. Pat. No. 3,379,792 discloses a blend of a polyphenylene oxide resin and from 0.1 to 25% by weight of a polyamide. The addition of the polyamide is disclosed as improving the flow properties of the polyphenylene oxide. However, Finholt also discloses that when the concentration of the polyamide exceeds 20% by weight, the compatibility between the polyamide is reduced and phase separation of the resins occurs. The Maruyama et al U.S. Pat. No. 4,338,421 generally discloses that the compatibility of polyphenylene oxide and polyamide resins may be improved by melt-blending the resins. Additionally, European patent application No. 131,445 discloses that an aromatic polyamide including alkylenephenylene or dialkylenephenylene groups improves the solvent and oil resistance and mouldability of polyphenylene ether resins.

Additionally, the compatability of polyphenylene ether and polyamide resins has been improved using various modifying or compatibilizing agents. For example, the Aycock et al U.S. Pat. No. 4,600,741 discloses polyphenylene ether-polyamide resin compositions including an acyl modified polyphenylene ether compatibilization agent. Similarly, the Ueno et al U.S. Pat. No. 4,315,086 discloses a polyphenylene oxide-polyamide composition including a compound selected from the group consisting essentially of liquid diene polymers, epoxy compounds and compounds having both an ethylenic carbon-carbon double bond or triple bond and a carboxylic acid, acid anhydride, acid amide, imide, carboxylic acid ester, amino or hydroxyl group. The International patent application No. WO85/053572 discloses polyphenylene ether-polyamide compositions including polycarboxylic acid modifiers such as citric acid, malic acid and agaricic acid. The Japanese patent No. 59-664452 discloses polyphenylene ether-polyamide compositions including 1,2-substituted olefin compounds including a carboxylic acid or anhydride group such as maleic anhydride, itaconic anhydride and phthalic acid. The European patent application No. 46,040 discloses polyphenylene ether-polyamide resin compositions further including a copolymer of a vinyl aromatic compound and either an a,B-unsaturated dicarboxylic acid anhydride or an amide compound thereof. Additionally, the European patent application No. 129,825 discloses polyphenylene ether-polyamide resin compositions containing organic phosphates for improving the compatibility and flame resistance properties of the compositions.

SUMMARY OF THE INVENTION

Accordingly, it is an object of the present invention to provide thermoplastic blend compositions comprising a polyphenylene ether resin and a polyamide resin, which compositions exhibit improved compatibility between the polyphenylene ether and polyamide resins. It is an additional object of the present invention to provide thermoplastic blend compositions comprising polyphenylene ether and polyamide resins which provide ductile, non-delaminating extrudates. It is a further object of the invention to provide thermoplastic blend compositions comprising polyphenylene ether and polyamide resins which exhibit improved impact properties.

These and additional objects are provided by the thermoplastic blend compositions according to the present invention which comprise a polyphenylene ether resin, a polyamide resin and a novel compatibilizing agent present in an amount sufficient to effect compatibilization of the polyphenylene ether resin and the polyamide resin. The novel compatibilizing agent comprises a compound selected from the group consisting of tetracarboxylic acids of aromatic and alicyclic compounds and dianhydride derivatives thereof, and halogen substituted phthalic anhydrides. The thermoplastic blend compositions provide ductile and non-delaminating extrudates which exhibit improved impact properties.

These and additional objects and advantages of the compositions according to the present invention will be more fully understood in view of the following detailed description.

DETAILED DESCRIPTION

The thermoplastic blend compositions according to the present invention comprise a polyphenylene ether resin, a polyamide resin and a compatibilizing agent present in an amount sufficient to effect compatibilization of the polyphenylene ether resin and the polyamide resin.

Polyphenylene ether resins adapted for use in the thermoplastic blend compositions of the present invention comprise polymers and copolymers having repeating structural units of the following general formula:

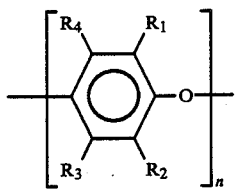

wherein $R_1$, $R_2$, $R_3$, and $R_4$ each individually represent a monovalent substituent such as hydrogen, halogen, alkyl, aryl, alkoxy and other hydrocarbon groups, and n represents the degree of polymerization. Preferably, n is at least 20, and more preferably, n is at least 50.

The polyphenylene ether resins suitable for use in the thermoplastic blend compositions of the present invention are well known in the art and may be prepared by any of a number of processes known in the art from corresponding phenols or reactive derivatives thereof. Examples of polyphenylene ether resins and methods for their production are set forth in the Hay U.S. Pat. Nos. 3,306,874 and 3,306,875 and in the Stamatoff U.S. Pat. Nos. 3,257,357 and 3,257,358, all of which are incorporated herein by reference. Throughout the Specification and Claims the term "polyphenylene ether" includes unsubstituted polyphenylene ether, substituted polyphenylene ether and polyphenylene ether copolymers.

Preferred polyphenylene ether resins adapted for use in the thermoplastic blend compositions of the present invention include, but are not limited to, poly(2,6-dimethyl-1,4-phenylene)ether; poly(2,6-diethyl-1,4-phenylene)ether; poly(2-methyl-6-ethyl-1,4-phenylene)ether; poly(2-methyl-6-propyl-1,4-phenylene)ether; poly(2,6-dipropyl-1,4-phenylene)ether; poly(2-ethyl-6-propyl-1,4-phenylene)ether; poly(2,6-dilauryl-1,4-phenylene)ether; poly(2,6-dipenyl-1,4-phenylene)ether; poly(2,6-dimethoxy-1,4-phenylene)ether; poly(2,6-diethoxy-1,4-phenylene)ether; poly(2-methoxy-6-ethoxy-1,4-phenylene)ether; poly(2-ethyl-6-stearyloxy-1,4-phenylene)ether; poly(2,6-dichloro-1,4-dichloro-1,4-phenylene)ether; poly(2-methyl-6-phenyl-1,4-phenylene)ether; poly(2,6-dibenzyl-1,4-phenylene)ether; poly(2-ethoxy-1,4-phenylene)ether; poly(2-chloro-1,4-phenylene)ether; poly(2,6-dibromo-1,4-phenylene)ether; and the like.

Polyamide resins which are particularly adapted for inclusion in the thermoplastic blend compositions of the present invention comprise polymeric condensation products which contain reoccurring aromatic and/or aliphatic amide groups as integral parts of the main polymeric chain. In general, the polyamide resins have linkages in the main chain of the following formula:

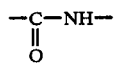

Procedures for preparing polyamides are well-known in the art, and details of suitable processes are set forth in "Polyamides", *Encyclopedia of Polymer Science and Technology*, John Wiley and Sons, Inc., Volume 10, pages 487 to 491 (1969).

Preferred polyamides for use in the thermoplastic blend compositions of the present invention include, but are not limited to, polyhexamethylene adipamide (nylon 6:6); polypyrrolidone (nylon 4); polycaprolactam (nylon 6); polyheptoalctam (nylon 7); polycaprylactam (nylon 8); polynonanolactam (nylon 9); polyundecanolactam (nylon 11); polydodecanolactam (nylon 12); polyhexamethylene azelaiamide (nylon 6:9); polyhexamethylene sebacamide (nylon 6:10); polyhexamethylene isophthalamide (nylon 6: ip); polymethaxylene adipamide (nylone MSD:6); polyamide of hexamethylenediamine and n-dodecanedioic acid (nylon 6:12); polyamide of dodecamethylenediamine and n-dodecanedioic acid (nylon 12:12); hexamethylene adipamide/caprolactam (nylone 6:6/6); hexamethylene adipamide/hexamethylene-isophthalimide (nylon 6:6/6ip); hexamethylene adipamide/hexamethylene-terephthalamide (nylon 6:6/6T); trimethylhexamethylene oxamide/hexamethylene oxamide (nylon trimethyl-6:2/6:2); hexamethylene adipamide/hexamethylene-azelaiamide (nylon 6:6/6:9); and hexamethylene adipamide/hexamethylene-azelaiamide (nylon 6:6/6:9); and hexamethylene adipamide/hexamethylene-azelaiamide caprolactam (nylon 6:6/6:9/6).

In accordance with an important feature of the present invention, the thermoplastic blend compositions include a compatibilizing agent which is present in an amount sufficient to effect compatibilization of the polyphenylene ether resin and the polyamide resin. The novel compatibilizing agent according to the present invention comprises a compound selected from the group consisting of tetracarboxylic acids of aromatic and alicyclic compounds and dianhydride derivatives thereof, and halogen substituted phthalic anhydrides.

For example, the compatibilizing agent may comprise a tetracarboxylic acid of an aromatic compound such as benzene, naphthalene or anthracene or the dianhydride derivative of a tetracarboxylic acid of an aromatic compound. Alternatively, the compatibilizing agent may comprise a tetracarboxylic acid of an alicyclic compound containing a hydrocarbon ring or the dianhydride derivative of a tetracarboxylic acid of such an alicyclic compound. In a preferred embodiment, when the compatibilizing agent comprises a tetracarboxylic acid of an alicyclic compound or a dianhydride derivative thereof, the alicyclic compound contains a hydrocarbon ring having from 5 to 12 carbon atoms, and more preferably, contains a hydrocarbon ring having from 5 to 7 carbon atoms. Preferred alicyclic compounds for use in the compatibilizing agent of the present invention include pentane and hexene.

Alternatively, the compatibilizing agent may comprise a halogen substituted derivative of phthalic anhydride. The halogen substituted phthalic anhydride may include one or more halogen substituents selected from fluorine, chlorine, bromine, iodine and mixtures thereof substituted on the aromatic ring portion of the phthalic anhydride. A particularly suitable compatibilizing agent comprises a bromine substituted phthalic anhydride.

The compatibilizing agents according to the present invention affect compatibilization of the polyphenylene ether resin and the polyamide resin and together therewith produce thermoplastic blend compositions providing ductile and non-delaminating extrudates which exhibit improved impact properties.

Preferably, the thermoplastic blend compositions according to the present invention include from about 5 to 95 weight percent of the polyphenylene ether resin, from about 5 to 95 weight percent of the polyamide resin and from about 0.01 to 10 weight percent of the compatibilizing agent. In additionally preferred embodiments, the thermoplastic blend ocmpositions include from about 25 to 75 weight percent of the polyphenylene ether resin, from about 25 to 75 weight percent of the polyamide resin and from about 0.01 to about 5 weight percent of the compatibilizing agent.

Additionally, the thermoplastic blend compositions according to the present invention may further include a impact modifier which comprises a rubbery high molecular weight polymer. The rubbery high molecular weight polymer may comprise natural and synthetic polymeric materials. More particularly, the rubbery high molecular weight polymer materials may comprise natural rubber, thermoplastic elastomers, homopolymers and copolymers, including random, block and graft copolymers which are well-known in the art. Specific examples of the rubbery high molecular weight polymer materials include, but are not limited to, natural rubber, butadiene polymers, rubbery styrene copolymers butadiene/styrene copolymers, isoprene polymers, chlorobutadiene polymers, butadiene/acrylonitrile copolymers, isobutylene polymers, isobutylene/butadiene copolymers, isobutylene/isoprene copolymers, acrylic ester polymers, ethylene propylene copolymers, ethylene/propylene/diene copolymers, thiokol rubber, polysulfide rubber, polyurethane rubber, and epichlorohydric rubber. Additionally, any of the aforementioned rubbery materials may be modified with an acid or anhydride as is known in the art for use in the blend compositions of the present invention.

The impact modifier comprising a rubbery high molecular weight polymer may be included in the thermoplastic blend compositions according to the present invention in an amount of from about 1 to 50 weight percent.

In addition, the thermoplastic blend compositions according to the present invention may further include other reinforcing additives, flame retardants, colorants, stabilizers and the like which are well-known in the art.

The compositions of the invention may be prepared by first preblending at least a portion of the polyphenylene ether resin with the compatibilizing agent and subsequently mixing the resultant polyphenylene ether-compatibilizing agent preblend product with the polyamide resin. If only a portion of the polyphenylene ether resin is preblended with the compatiblizing agent, the remaining portion of the polyphenylene ether resin is then combined with the polyamide-preblend mixture. Additionally, the preblend of the polyphenylene ether and the compatibilizing agent is preferably extruded at an elevated temperature prior to mixing with the polyamide resin. Suitable elevated temperatures are generally within the range of about 270° to 350° C. although the temperature may vary somewhat depending on the proportions of ingredients included in the preblend. Similarly, it is preferred that the mixture of the polyamide resin and the polyphenylene ether resin-compatibilizing agent preblend is extruded at an elevated temperature as set forth above. The remaining ingredients such as impact modifiers, reinforcing additives, flame retardants, colorants, stabilizers and the like set forth above may be directly added to the thermoplastic blend compositions or to one of the polyphenylene ether and polyamide resins prior to blending with the other. For example, the impact modifier may be added either to the polyphenylene ether-compatibilizing agent preblend or to the polyamide prior to mixing the preblend and the polyamide. Alternatively, the impact modifier may be added to the blend resulting from mixing of the polyamide and the preblend. The following examples demonstrate the thermoplastic blend compositions according to the present invention and method for preparing the same.

EXAMPLE 1

This example demonstrates the preparation of a thermoplastic blend composition according to the present invention wherein the compatiblizing agent comprises a tetracarboxylic acid an alicyclic compound: 100 parts by weight of polyhenylene ether were mixed with 1 part by weight of 1,2,3,4-cyclopentane tetracarboxylic acid. The polyphenylene ether comprised a copolymer formed of 95% 2,6-dimethylphenol and 5% 2,3,6-trimethylphenol. 0.2 parts by weight of a lubricant comprising a polyoxyalkylene glycol block polymr were also added. The resultant preblend was extruded at 324 to 335° C. in a 28 mm WP twin screw extruder to produce a smooth extrudate. 50 parts by weight of the resultant extrudate were then mixed with 50 parts by weight of a polyamide comprising Nylon 66 and 5 parts by weight Kraton G (a thermoplastic rubbery high molecular weight polymer from Shell Chemical Company). The resultant blend was then extruded at a temperature of about 315° to 321° C. in a 28 mm WP twin screw extruder to form a smooth, ductile and non-delaminating alloy which exhibited good compatibility between the polyphenylene ether resin and the polyamide resin.

EXAMPLE 2

This example demonstrates the preparation of a thermoplastic blend composition according to the present invention wherein the compatibilizing agent comprises a tetracarboxylic acid of an aromatic compound. 100 parts by weight of the polyphenylene ether of Example 1 were mixed with 1 part by weight of 1,4,5,8-naphthalene tetracarboxylic acid and 0.2 parts by weight of the lubricant set forth in Example 1. The resultant preblend was extruded in the same manner as the preblend set forth in Example 1. A smooth dark extrudate was produced. The extrudate was then blended with 50 parts by weight of a polyamide comprising Nylon 66 and 5 parts by weight of a rubbery high molecular weight polymer comprising Kraton G. The resultant mixture was then extruded in the same manner as the mixture in Example 1. A smooth, ductile and non-delaminating alloy was produced which exhibited good compatibility between the polyphenylene ether and polyamide resins.

EXAMPLE 3

This example demonstrates the preparation of a thermoplastic belnd composition according to the present invention wherein the compatibilizing agent comprises a tetracarboxylic acid dianhydride derivative of an aromatic compound. The procedure of Example 1 was repeated except that 1,2,4,5-benzene tetracarboxylic acid anhydride (pyromellitic anhydride) was substituted for the 1,2,3,4-cyclopentane tetracarboxylic acid compatibilizing agent of Example 1. The preblend produced a smooth extrudate and the final alloy extrudate product was smooth, ductile and non-delaminating and exhibited good compatibility between the polyphenylene ether and polyamide resins.

EXAMPLE 4

This example demonstrates the preparation of a thermoplastic blend composition according to the present invention wherein the compatibilizing agent comprises a halogen substituted phthalic anhydride, namely tetrabromophthalic anhydride. The procedure of Example 1 was repeated except that tetrabromophthalic anhydride was substituted for 1,2,3,4-cyclopentane tetracarboxylic acid as the compatibilizing agent. Additionally, 0.5 parts by weight DiCup 40KE (40% dicumyl peroxide and 60% inert filler) serving as a radical source were added. The preblend extrudate was dark and foamed. The alloy extrudate was ductile and non-delaminating and exhibited good compatibility between the polyphenylene ether and polyamide resins.

COMPARATIVE EXAMPLE

This example demonstrates the preparation of a thermoplastic blend composition which does not include the compatiblizing agent of the present invention. The procedure of Example 1 was repeated except that the preblend did not include a compatibilizing agent. While the preblend extrudate was smooth, the final alloy extrudate exhibited a high degree of delamination and poor compatibility between the polyphenylene ether and polyamide resins.

The final extrudates of the thermoplastic blend compositions from Examples 1-4 and the Comparative Example set forth above were injection molded to provide samples which were subjected to impact strength measurements, the results of which are set forth in the Table.

TABLE

| Example | Compatibilizing Agent | Compatibility | Notched Izod Impact (ft. lbs.) |
| --- | --- | --- | --- |
| 1 | tetracarboxylic acid alicyclic compound | good | 1.2 |
| 2 | tetracarboxylic acid aromatic compound | good | 0.7 |
| 3 | tetracarboxylic acid anhydride aromatic compound | good | 0.6 |
| 4 | tetrabromophthalic anhydride | good | 0.6 |
| Comparative | None | poor | <0.5 |

The results set forth in the Table demonstrate that the thermoplastic blend compositions according to the present invention not only provide good compatibility between the polyphenylene ether and polyamide resins to provide smooth, ductile and non-delaminating extrudates, the compositions also improve the impact strength properties of polyphenylene ether and polyamide resin blends.

The preceeding Examples are set forth to illustrate specific embodiments of the invention and are not intended to limit the scope of the compositions and methods of the present invention. Additional embodiments and advantages within the scope of the claimed invention will be apparent to one of ordinary skill in the art.

What is claimed is:

1. A thermoplastic blend composition, comprising:
   (a) a polyphenylene ether resin;
   (b) a polyamide resin;
   (c) a compatibilizing agent present in an amount sufficient to effect compatibilization of the polyphenylene ether resin and the polyamide resin, said compatibilizing agent comprising a compound selected from the group consisting of tetracarboxylic acids of aromatic compounds, tetracarboxylic acids of alicyclic compounds, dianhydride derivatives of tetracarboxylic acids of aromatic compounds, dianhydride derivatives of tetracarboxylic acids of alicyclic compounds, and halogen substituted phthalic anhydrides; and
   (d) an impact modifier comprising a rubbery polymer.

2. A thermoplastic blend composition as defined by claim 1, comprising 5 to 95 weight percent of the polyphenylene ether resin, 5 to 95 weight percent of the polyamide resin, 0.01 to 10 weight percent of the compatibilizing agent and 1 to 50 weight percent of the impact modifier.

3. A thermoplastic blend composition as defined by claim 1, wherein the impact modifier is selected from the group consisting of natural rubber, butadiene homopolymers, butadiene/styrene copolymers, isoprene homo-polymers, chlorobutadiene polymers, butadiene/acrylonitrile copolymers, isobutylene homopolymers, isobutylene/butadiene copolymers, isobutylene/isoprene copolymers, acrylic ester polymers, ethylene propylene copolymers, ethylene/propylene/diene copolymers, polysulfide rubber, polyurethane rubber, and epichlorohydric rubber.

4. A thermoplastic blend composition as defined by claim 3, wherein the impact modifier comprises a butadiene/styrene copolymer.

* * * * *